June 22, 1954 R. K. LOCKHART 2,682,012
TELEVISION RASTER DISTORTION CORRECTION
Filed Sept. 8, 1952
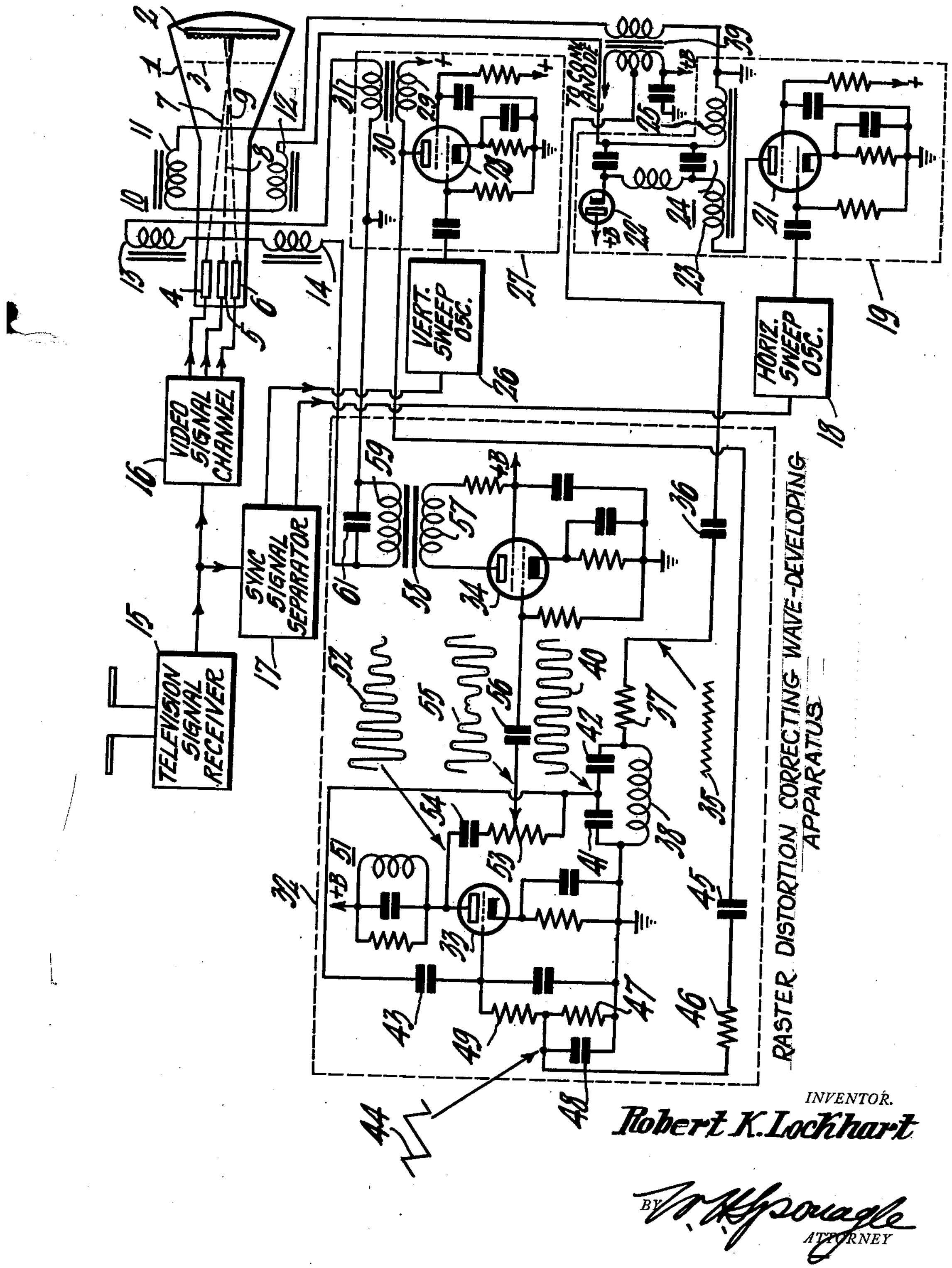
INVENTOR.
Robert K. Lockhart
BY [signature]
ATTORNEY Patented June 22, 1954

2,682,012

UNITED STATES PATENT OFFICE 2,682,012

TELEVISION RASTER DISTORTION CORRECTION

Robert K. Lockhart, Moorestown, N. J., assignor to Radio Corporation of America, a corporation of Delaware Application September 8, 1952, Serial No. 308,357

9 Claims. (Cl. 315—24)

This invention relates to systems and apparatus for deflecting an electron beam of a cathode ray tube and has particular reference to systems for energizing the deflection apparatus so as to scan a substantially rectangular raster at the target electrode of the tube.

In many types of cathode ray tubes, it is desired to deflect an electron beam over a target electrode in such a manner as to scan a substantially rectangular raster. Where the target electrode has a curved configuration of such a character that its center of curvature is not appreciably different from the point about which the electron beam is deflected and when the angle of deflection is relatively small, a substantially rectangular raster may be scanned with apparatus which may be uniformly energized. However, where the cathode ray tube is of the type where the target electrode is relatively flat and the deflection angle is large, it ordinarily is difficult to scan a raster at the target electrode which is rectangular. This is particularly true where the deflecting field is required to be essentially uniform throughout. In such a case, the raster has a shape which has a deformation generally known as "pin-cushion" distortion.

It is an object of the present invention to provide an improved and simplified system for energizing the deflection apparatus of a cathode ray tube in a novel manner so as to control, to a certain degree, the shape of the raster scanned at a relatively flat target electrode by means of a substantially uniform deflecting field.

Another object of the invention is to provide an improved and simplified system for energizing the deflection apparatus of a cathode ray tube so as to eliminate, or at least to minimize, the pin-cushion type of raster distortion produced under certain conditions.

Still another object of the invention is to provide an improved and simplified system for energizing the deflection apparatus of a cathode ray tube so as to eliminate pin-cushion distortion of the raster scanned upon a relatively flat target electrode under the control of a substantially uniform deflecting field.

A further object of the invention is to provide an improved and simplified system for energizing the deflection apparatus of a cathode ray tube by means of a wave having a periodicity at one of the deflecting frequencies and having a component which varies as a function of the other deflecting frequency.

In accordance with the invention, there is provided a system for energizing the deflection apparatus of a cathode ray tube in such a manner as to deflect an electron beam suitably to scan a substantially rectangular raster at a target electrode of the tube and which utilizes deflection waves at horizontal and vertical scanning frequencies, one of which is modified by a component varying as a function of the other scanning frequency. The apparatus includes horizontal and vertical deflection wave generators coupled, respectively, to the horizontal and vertical windings of the deflection yoke. A wave component is produced with variations at both the vertical and horizontal deflection frequencies and is added to the vertical deflection wave for impression upon the vertical windings of the yoke. The magnetic field produced by the vertical windings energized by such a wave deflects an electron beam so as to straighten the top and bottom portions of the scanned raster.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram, partly in block form, of a television signal-receiving and image-reproducing system embodying the invention.

The illustrated form of the invention is a color television system in which a multicolor kinescope having a plurality of electron beams is employed. In the drawing, the color kinescope 1 represents one form of a cathode ray tube with which the present invention may be employed. The kinescope 1 is of the general type described in an article titled "General Description of Receivers for the RCA Color Television System Which Employ Direct-View Tri-Color Kinescopes" published in the RCA Review, volume XI, No. 2, June 1950 at pages 228 to 232. Such a tube also forms the subject matter of Patent No. 2,595,548, issued May 6, 1952, to Alfred C. Schroeder, and titled "Picture Reproducing Apparatus." This tube is provided with a substantially flat luminescent screen 2 having a multiplicity of small phosphor areas arranged in groups and capable, respectively, of producing light of the different primary colors in which the image is to be reproduced when excited by an electron beam. In back of, and spaced from, the screen 2 there is an apertured masking electrode 3 having an aperture for, and in alignment with, each group of phosphor areas of the screen 2. The kinescope also has a plurality of electron guns equal in number to the number of primary colors in which the image is to be reproduced. In the usual three-color television system where the primary colors are red, green and blue, the multicolor kinescope is provided with three electron guns such as diagrammatically represented at 4, 5 and 6 for producing electron beams 7, 8 and 9 by which to energize the red, green and blue phosphor areas of the screen 2. The electron beams, travelling different paths from their respective guns, are suitably controlled by apparatus (not shown) so that they converge substantially in the plane of the masking electrode 3. Such beam convergence apparatus is not part of, nor is it necessary to an understanding of, this invention. Accordingly, all three of the electron beams 7, 8 and 9 pass through the apertures of the masking electrode from different directions and impinge upon different phosphor areas of the groups so as to produce red, green and blue light.

The color kinescope 1 also is provided with a deflection yoke 10 for deflecting the electron beams 7, 8 and 9 over the target electrode structure which, for the purpose of the present invention, may be considered as including the luminescent screen 2 and the apertured masking electrode 3. Such deflection of the beams over the target electrode structure is for the purpose of scanning the usual raster for image-reproducing purposes. The deflection yoke includes horizontal and vertical field-producing components such as the coils or windings 11—12 and 13—14, respectively. It will be understood that the coils of the deflection yoke are of the usual form and are illustrated in a diagrammatic manner in the drawing primarily for the purpose of more clearly illustrating the invention.

In the present case where the deflection yoke is required to effect deflection of a plurality of electron beams traversing the magnetic field produced by the yoke in spaced paths, it is necessary that the yoke be of such a character that the magnetic field is uniform in intensity throughout substantially the entire deflection region. This is necessary in order that all of the electron beams 7, 8 and 9 be similarly deflected throughout the entire raster to be scanned at the target electrode. The fulfilment of this requirement and also the fact that the electron beams are required to scan a raster at a relatively flat target electrode and through appreciable deflection angles results in an undesired pin-cushion distortion of the scanned raster. It is the purpose of this invention to effect some correction of the distorted raster shape.

The television system in which the invention is embodied also includes a conventional television signal receiver 15 from which it will be understood is derived a composite television signal. This composite television signal includes video and system control signals such as the horizontal and vertical synchronizing pulses. The composite signal derived from the receiver 15 is impressed by way of a video signal channel 16 upon the electron beam control apparatus including the guns 4, 5 and 6 of the color kinescope. In this connection, it will be understood that the red, green and blue video signals which are impressed upon the guns 4, 5 and 6 effect the intensity modulation of the electron beams 7, 8 and 9, respectively, in accordance with the red, green and blue video signals representing the image to be reproduced. Also, the composite television signal derived from the receiver 15 is impressed upon a sync signal separator 17 which may be of conventional design. Accordingly, it will be understood that the sync signal separator functions to separate the horizontal and vertical synchronizing pulses from the video signals and also from one another.

The horizontal synchronizing pulses derived from the sync signal separator 17 are impressed upon a horizontal sweep oscillator 18 which may be conventional and will be understood to develop a substantially sawtooth wave at the horizontal deflection frequency. The horizontal sawtooth wave derived from the oscillator 18 is impressed upon a horizontal output stage 19. This latter apparatus also may be conventional and in one of the forms, particularly as shown in Figure 19, in an article titled "Television Deflection Circuits" by A. W. Friend, published in RCA Review, March 1947, volume VIII, No. 1. The horizontal output stage 19 includes an electron tube 21 deriving its space current from a suitable source indicated at +B through a damper diode tube 22 and a winding 23 of an output transformer 24. Another winding 25 of the output transformer is coupled to the horizontal winding 11—12 of the deflection yoke 10.

The vertical synchronizing pulses derived from the sync signal separator 17 are impressed upon a vertical sweep oscillator 26 which may be conventional in design and functions to produce a substantially sawtooth wave at the vertical deflection frequency. The vertical sawtooth wave is impressed upon a vertical output stage 27 which generally is of a conventional character. The vertical output stage includes an electron tube 28 having an output circuit which is coupled to its anode. The output circuit includes a primary winding 29 of an output transformer 30. The secondary winding 31 of the vertical output transformer is coupled to the vertical deflection windings 13—14 of the yoke 10.

The raster distortion correcting wave-developing apparatus 32 in accordance with this invention is coupled to the horizontal and vertical beam deflection circuits for a suitable combination of signals at these two frequencies to effect the development of the desired wave. The wave-developing apparatus 32 includes a modulator electron tube 33 and a power amplifier electron tube 34. The desired combination of the vertical and horizontal deflection frequency waves is effected by the tube 33 in a manner to be described. A wave having the desired form which is derived from the modulator tube 33 is power-amplified by the tube 34 and is impressed, together with the conventional sawtooth wave at vertical deflection frequency, upon the vertical deflection windings 13—14 in a manner to be described.

A substantially sawtooth wave 35 at horizontal sweep frequency, and derived from the horizontal deflection circuits, is impressed by means including a coupling capacitor 36 upon a first wave-shaping network of a resistive-inductive character and including a resistor 37 and a circuit including an inductor 38 which is tuned to the horizontal deflection frequency. The wave 35 may be conveniently obtained, for example, from the secondary winding of a horizontal beam convergence transformer 39, having its primary winding connected in the horizontal deflection output circuit. The wave-shaping network produces a substantially sinusoidal wave 40 at horizontal deflection frequency and is part of a first one of two input circuits with which the wave-developing apparatus 32 is provided. By means of a capacitive divider including capacitors 41 and 42, the sine wave 40 is impressed in suitable magnitude, by means including a coupling capacitor 43, upon the control grid of the modulator tube 33.

A substantially sawtooth wave 44 at vertical deflection frequency which is derived from the anode of the vertical output tube 28 is impressed, by means including a capacitor 45 upon an integrator-attenuator circuit including resistors 46 and 47 and a capacitor 48 in shunt with resistor 47. The integrator-attenuator circuit thus, is of a resistive-capacitive character functioning as a second wave-shaping means and is part of the second input circuit of the wave-developing apparatus 32. This vertical sawtooth wave is impressed, by means including a resistor 49, also upon the control grid of the modulator tube 33. In this way, there is impressed upon the grid of the modulator tube the sum of the horizontal sine wave 40 and the vertical sawtooth wave 44. As a result, there is developed in the output circuit of the modulator tube, which includes a resonant circuit 51 connected to the anode of the tube and tuned to the horizontal deflection frequency, a wave 52 which is a horizontal sine wave that is 100% modulated in amplitude by a vertical sawtooth wave.

A high impedance potentiometer 53 is coupled, by means including a capacitor 54, between the anode and control grid of the modulator tube 33. By means of such an arrangement, the unmodulated and modulated sine waves 40 and 52, respectively, are added in phase opposition. The result of such an addition produces at the movable contact of the potentiometer a raster distortion-correcting wave 55. It is seen that the resultant wave 55 is a substantially sinusoidal wave at the horizontal deflection frequency which, during the first half of a cycle corresponding to the period of one field, has a predetermined phase. The amplitude of this wave decreases substantially linearly to zero at a time corresponding substantially to the mid-point of the field. From such a point, the amplitude of the wave 55 increases linearly so that it reaches full amplitude at the end of the field.

However, the phase of the increasing amplitude sinusoidal portion of the wave 55 is 180° displaced from that of the decreasing amplitude portion of this wave.

The composite or correcting wave 55 is impressed, by means including a coupling capacitor 56, upon the control grid of the power amplifier tube 34. The output circuit of this tube which is derived from its anode includes the primary winding 57 of an impedance transformer 58. The secondary winding 59 of the impedance transformer, which is shunted by a capacitor 61 so as to resonate the secondary circuit substantially at the horizontal deflection frequency, is connected in series between the secondary winding 31 of the vertical output transformer 30 and the vertical deflection coil 14. By such means, the raster distortion-correcting wave corresponding to the wave 55 is impressed upon the vertical winding of the beam deflection yoke 10.

It will be seen that the correcting wave, when added to the conventional sawtooth deflection wave, is of such a character to effect the desired correction of the raster distortion. Also, it will be appreciated that the wave-developing apparatus in accordance with this invention includes a minimum of components, thereby producing a simpler and more efficiently operating type of apparatus than heretofore employed for such purpose.

The nature of the invention may be ascertained from the foregoing description of an illustrative embodiment thereof. Its scope is pointed out in the appended claims.

What is claimed is:

1. In a system for energizing deflection apparatus of a cathode ray tube to deflect an electron beam suitably to scan a raster of substantially rectangular shape at a target electrode of said tube by means of horizontal and vertical sawtooth deflection wave generators coupled respectively to horizontal and vertical beam-deflecting field-producing components, raster distortion correcting wave-developing apparatus comprising, two input circuits and an output circuit, said output circuit being coupled to said vertical beam-deflecting field-producing component, means coupling said input circuits respectively to said horizontal and vertical deflection wave generators, first wave-shaping means in said horizontal input circuit to produce a horizontal frequency wave, second wave-shaping means in said vertical input circuit to produce a vertical frequency wave, a modulator having an input circuit coupled to both of said wave-shaping means and also having an output circuit in which is developed a horizontal frequency wave completely modulated with said vertical frequency wave, and means adding in phase opposition said modulated and unmodulated horizontal frequency waves to develop in said wave-developing apparatus output circuit a correcting wave at horizontal deflection frequency varying in amplitude at vertical deflection frequency from a maximum to a minimum in a first interval and from a minimum to a maximum in a succeeding second interval, said correcting wave having opposite phases in said two intervals.

2. Raster distortion correcting wave-developing apparatus as defined in claim 1 wherein, said first wave-shaping means is of a character to produce a substantially sinusoidal wave at horizontal deflection frequency.

3. Raster distortion correcting wave-developing apparatus as defined in claim 2 wherein, said first wave-shaping means includes a tuned circuit resonant at said horizontal deflection frequency.

4. Raster distortion correcting wave-developing apparatus as defined in claim 1 wherein, said second wave-shaping means is of a character to produce a substantially sawtooth wave at vertical deflection frequency.

5. Raster distortion correcting wave-developing apparatus as defined in claim 4 wherein, said second wave-shaping means includes an integrator-attenuator circuit having a time constant corresponding to a vertical deflection period.

6. Raster distortion correcting wave-developing apparatus as defined in claim 1 wherein, said modulator includes an electron tube having a cathode, a control grid and an anode, said cathode being common to said two input circuits and to said output circuit, said control grid being common to said two input circuits, and said anode being included in said output circuit.

7. Raster distortion correcting wave-developing apparatus as defined in claim 6 wherein, said wave-adding means is coupled to said modulator tube anode and control grid.

8. Raster distortion correcting wave-developing apparatus as defined in claim 7 wherein, said wave-adding means includes a potentiometer having a resistive element coupled between said modulator tube anode and control grid and a movable element in contact with said resistive element and forming a terminal at which said corrective wave is developed.

9. In a system for energizing deflection apparatus of a cathode ray tube to deflect an electron beam suitably to scan a raster of substantially rectangular shape at a target electrode of said tube by means of horizontal and vertical sawtooth deflection wave generators coupled respectively to horizontal and vertical beam-deflecting field-producing components, an auxiliary raster distortion correcting wave-developing apparatus comprising, a modulator including an electron tube having a cathode, a control grid and an anode, means including a resistive-inductive circuit tuned for resonance at said horizontal deflection frequency and coupling said modulator tube control grid to said horizontal deflection wave generator to impress upon said control grid a horizontal frequency sine wave, means including a resistive-capacitive circuit having a time constant corresponding to a vertical deflection period and coupling said modulator tube control grid to said vertical deflection wave generator to impress upon said control grid a vertical frequency sawtooth wave, means including a capacitive-inductive circuit tuned for resonance at said horizontal deflection frequency and coupled to said modulator tube anode to produce a horizontal frequency sine wave completely modulated with said vertical frequency sawtooth wave, and means adding in phase opposition said modulated and unmodulated horizontal frequency sine waves and including a potentiometer having a high impedance resistive element coupled between said modulator tube anode and control grid and a movable element in contact with said resistive element and forming a terminal at which to develop said auxiliary correcting wave at horizontal deflection frequency varying in amplitude at vertical deflection frequency from a maximum to a minimum in a first interval and from a minimum to a maximum in a succeeding second interval, said correcting wave having opposite phases in said two intervals.

References Cited in the file of this patent

UNITED STATES PATENTS

| Number | Name | Date |
|---|---|---|
| 2,574,946 | White | Nov. 13, 1951 |
| 2,582,014 | De France et al. | Jan. 8, 1952 |
| 2,620,456 | White | Dec. 2, 1952 |